May 24, 1927. 1,629,530
C. REINEKE
MULTICYLINDER INTERNAL COMBUSTION ENGINE
Filed Aug. 7, 1925  2 Sheets-Sheet 2
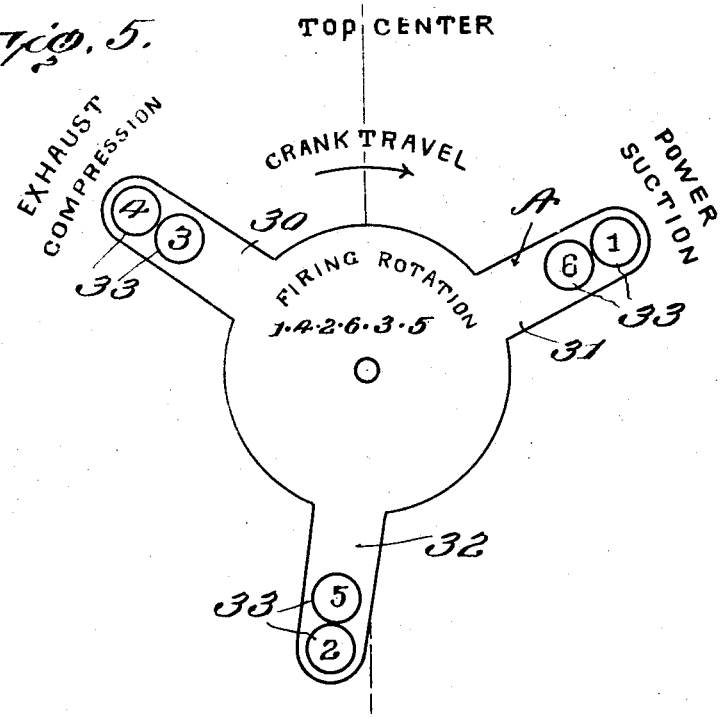
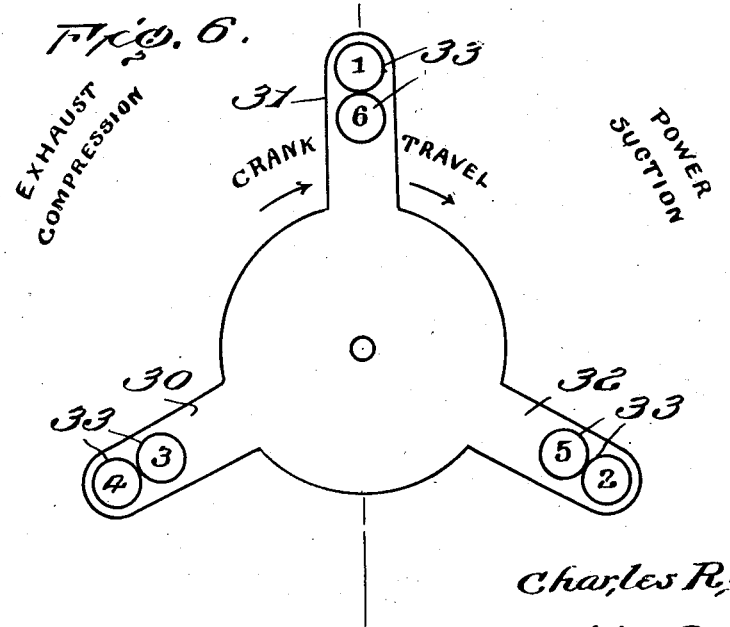
Inventor
Charles R. Reineke
By Wm C. Dyne
Attorney Patented May 24, 1927.

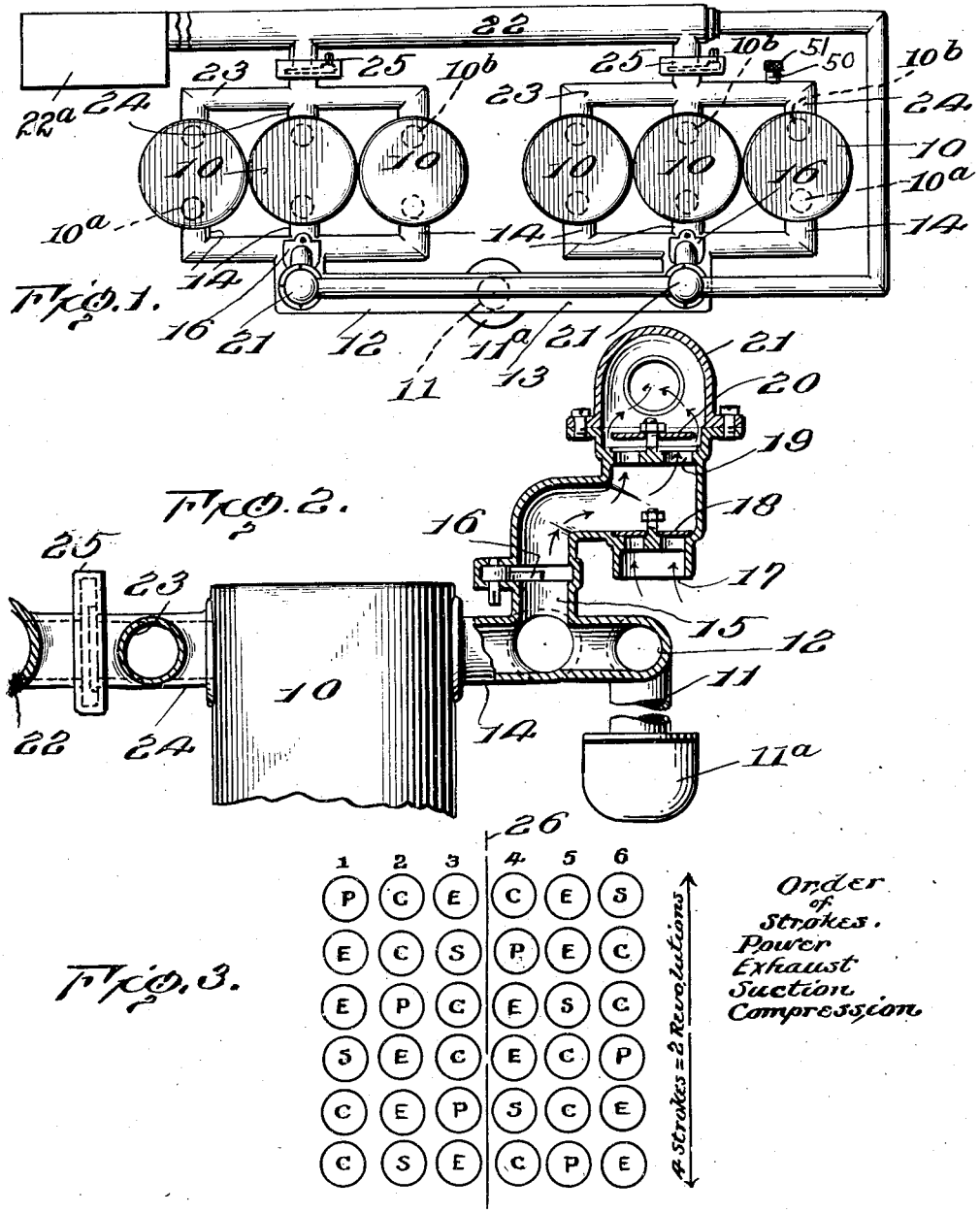

1,629,530

UNITED STATES PATENT OFFICE.

CHARLES REINEKE, OF NEW YORK, N. Y., ASSIGNOR TO THE REINEKE MOTOR CORPORATION, OF NEW YORK, N. Y., A CORPORATION OF DELAWARE.

MULTI-CYLINDER INTERNAL-COMBUSTION ENGINE.

Application filed August 7, 1925. Serial No. 48,750.

This invention relates to improvements in brakes, fuel economizers and air pumps for motor vehicles.

The primary object of the invention is to combine novel mechanism with the engine of a motor vehicle, so that the engine may be used for braking purposes.

Another object of the invention is to provide the exhaust pipe of a motor vehicle engine with an auxiliary valve adapted to be controlled by the operator to enable the exhaust gases to be placed under maximum pressure for creating a pneumatic resistance in the engine cylinders.

A further object of the invention is to provide a multi-cylinder motor vehicle internal combustion engine with specially arranged exhaust gas passageways controlled by auxiliary valves and adapted to permit the full compression pressure of each cylinder to be utilized for braking purposes.

A still further object is to furnish the multi-cylinder engine of a motor vehicle with specially arranged intake passageways, to permit air compressed in each cylinder to be discharged without permitting said air to enter an adjacent cylinder of the engine.

Another object is to specially arrange the intake passageways and combine them with the exhaust gas pipe, so that compressed air discharged from the cylinders through the intake passageways, may be forced into the exhaust gas pipe and be then discharged through the muffler to eliminate noise.

A further and important object of the invention is to furnish means to permit pure air to be drawn into the cylinders of an engine during a braking period, means to insure compression of said air within the cylinders and exhaust gas passageways equal to that obtained during the normal working of the engine, and means to permit the compressed air to be discharged by way of the intake passageways into the exhaust passageways and then out through the muffler of the latter.

A still further object is to provide the engine intake conduit with an auxiliary inlet, controlled by the operator, to allow the fuel mixture to be diluted when occasion permits.

Another object of the invention is to provide means combined with an internal combustion engine to permit a plurality of the cylinders of the engine to function as a prime mover while other cylinders of the engine are functioning as an air pump.

With the foregoing objects outlined and with other objects in view which will appear as the description proceeds, the invention consists in the novel features hereinafter described in detail, illustrated in the accompanying drawings and more particularly pointed out in the appended claims.

Referring to the drawings:

Fig. 1 is a top plan view of a six cylinder, four cycle engine equipped with my improvements;

Fig 2 is an elevation of the upper portion of one of the cylinders of the engine with my improvements thereon, certain parts being shown in vertical section;

Fig. 3 is a chart illustrating the actions taking place in the engine during two revolutions of the crank shaft;

Fig. 4 is a view of my improved arrangement;

Fig. 5 is a diagram to illustrate that the exhaust valve of one cylinder of the engine will begin to open before the exhaust valve of another cylinder of the engine has completed its exhaust stroke; and Fig. 6 is a similar view to illustrate that the intake valve of one cylinder commences to open while the intake valve of another cylinder is remaining open to complete the suction stroke.

Motorists have long recognized that the engine of the automobile may be used to some extent for braking purposes, when the clutch is in and the gas control lever is at zero. Motorists frequently cut off the ignition at this time, so that in going down hill, the engine is driven by the wheels of the vehicle and it functions similar to an air compressor. When the engine is used in this manner, the pistons suck in a mixture of air and fuel and force this mixture into the exhaust pipe. Consequently the cylinders and exhaust pipe will contain a mixture of air and fuel, when the ignition is again thrown on. As a result, the heated exhaust gas leaving one or more of the cylinders may cause the mixture in the exhaust pipe to explode and blow off the muffler of the car.

It has been recognized prior to the present time that this method of braking could only be used on relatively slight inclines and that it was open to the above mentioned objection. Consequently proposals have been made to eliminate these drawbacks. One such method consists in placing an auxiliary valve in the exhaust pipe between the ordinary exhaust valves and the muffler, so that a back pressure may be created in the exhaust pipe. In addition to this, an auxiliary air inlet has been placed in the intake manifold between the carburetor and the intake valves, and this auxiliary air inlet is controlled by a manually actuated valve, so that pure air may be fed to the cylinders during braking periods instead of the mixture of air and fuel.

However, if that method is employed with engines having four cylinders or more, the full compression pressure of each cylinder can not be utilized, for as soon as the piston of one cylinder has partly completed its exhaust stroke, a second cylinder will commence to exhaust and this will cause the pressure which has been obtained in the first mentioned cylinder to be forced through the exhaust pipe over into the second mentioned cylinder, so that instead of obtaining the full compression pressure, only a part thereof is obtainable. In the mechanism which I will hereinafter describe in detail, I have provided means to overcome this objection.

Referring now to Figs. 1 and 2 of the accompanying drawings, 10 designates the cylinders of an internal combustion engine having the usual intake and exhaust valves 10$^a$ and 10$^b$, respectively. For the purpose of disclosing my invention, I will illustrate and describe the same in connection with a six cylinder motor.

Instead of having an intake of the usual character, I divide the intake pipe 11 above the carburetor 11$^a$ into two branches, 12 and 13, each branch having three outlets 14, leading to three cylinders. Each branch is provided with an auxiliary air inlet and air discharge pipe 15 having a valve 16 under control of the operator for regulating the same. The pipe 15 has an admission orifice 17 controlled by an automatic check valve 18. The pipe 15 also has exit apertures 19 controlled by an automatic check valve 20. In the operation of the present invention, the air used for braking purposes is forced outwardly through the intake branches instead of through the exhaust, and as this air is under considerable pressure, it would create an objectionable noise if it was discharged directly into the atmosphere. To prevent this annoyance, I provide an auxiliary exhaust conduit 21 which receives the air discharged through 19 and leads the same around to the main exhaust pipe 22 and muffler 22$^a$, so that it will be discharged from the engine.

Instead of employing the ordinary exhaust manifold, I provide an exhaust manifold consisting of two sections 23, each having three branches 24 leading to three of the cylinders of the engine. In each of these sections I arrange an auxiliary exhaust valve 25 which will be under the control of the operator at all times, to permit a back pressure to be created between the cylinders and the main exhaust pipe 22.

Referring now to Fig. 3, it may be stated that the numerals at the top of the chart indicate the six cylinders of the engine. The letters in the circles are abbreviations for "power," "compression," "exhaust," and "suction," respectively. From the first horizontal row of this chart it may be seen that during the first period of two revolutions of the crank shaft, the piston of the first cylinder is exerting a power stroke, the piston of the second one a compression stroke, the third exhaust, the fourth compression, fifth exhaust, and sixth suction. The actions during ensuing periods are indicated in the succeeding five rows of circles. I have drawn a line 26 through this chart to illustrate that in either the group formed by the first three cylinders or the group made up of the second three cylinders, no two cylinders of a single group aspirate or exhaust at one time, while it is common in the two groups combined for two cylinders to be aspirating or exhausting at the same time. Assuming then that it is common in a six cylinder engine for instance, for two cylinders to be exhausting at the same time, it will be noted that if the engine is to be used for braking and an auxiliary valve is placed in the exhaust pipe, the gas which has been compressed into the exhaust pipe during the exhaust stroke of one cylinder will, before reaching maximum pressure, readily pass into a second cylinder as soon as the exhaust valve of the last mentioned cylinder begins to open. To overcome this loss of pressure when the engine is used for braking purposes, I have devised the means illustrated in Figs. 1, 2 and 4.

In the diagrams illustrated in Fig. 5, the large circle indicates the crank shaft of the engine and 30, 31 and 32 indicate the cranks. Only three cranks are shown but it will be understood that in a six cylinder motor there will actually be six cranks, each two arranged as a pair, one behind the other. For instance, two cranks 31 will be arranged at the same angle and will take care of the pistons 33 of the cylinders 1 and 6; cranks 32 will take care of the pistons of cylinders 2 and 5; while cranks 30 will be associated with the pistons of cylinders 3 and 4. Now comparing Fig. 5 with Fig. 3, it will be found that with the cranks in the positions shown (that is with cranks 31 at the position A), the piston 33 in No. 1 cylinder will be exerting power; the piston in No. 2 will be on compression; No. 3 exhaust; No. 4 compression; No. 5 exhaust; and No. 6 suction. If the crank is turned 120 degrees from the position shown in Fig. 5 the actions in the various cylinders will be those indicated in the second horizontal row of Fig. 3. If the crank shaft is turned another 120 degrees, the actions will be those indicated in the third row of Fig. 3, and so on.

It will therefore be seen, for instance, that when the crank 30 of cylinder 3 is about two-thirds of the way on its upstroke with that cylinder exhausting, the exhaust valve of cylinder No. 5 will open, and if a valve 27 is placed in the exhaust pipe as shown in Fig. 4, this will cause the gas compressed in No. 3 cylinder and the exhaust pipe to enter cylinder No. 5 as soon as the exhaust valve of that cylinder opens. In other words, these diagrams illustrate that there is an overlapping of the actions in all engines containing four cylinders or more. Due to this overlapping, the full compression pressure cannot be obtained during an exhaust stroke with an arrangement of the character having an ordinary exhaust pipe with a back pressure valve arranged therein.

The improved structure which I have designed prevents such overlapping, as the gas compressed into either of the exhaust gas passageways 23 during an exhaust stroke, cannot pass to any other cylinder on the opposite side of the dividing line 26, and cannot enter any other cylinder on the same side of the dividing line, as the exhaust valves of those cylinders will never open at that time. From Fig. 1 it may be seen that when the valves 25 are closed, gas compressed in No. 1 cylinder, during the exhaust stroke of that cylinder, will fill one of the passageways 23 and the branches 24 of that passageway, but it cannot pass to either one of the other cylinders 2 and 3 of the first group as the exhaust valves of cylinders 2 and 3 will never open until the piston of cylinder No. 1 has compressed the gas to a pressure equalling that of the compression pressure of the engine. Due to my improved construction, I therefore obtain the maximum pressure for braking purposes.

From diagrams in Figs. 3 and 6, it may be seen that the same overlapping action takes place in the intake manifold of the ordinary type, if an auxiliary valve is placed in the intake manifold.

Referring again to the exhaust action, it will be noted that I have altered the ordinary exhaust manifold, so as to control each three cylinders with a shut-off valve 25 and by this method obtain full compression pressure in each cylinder at the exhaust stroke. We will now assume that the two valves 25 are shut and the car is driving the motor. Therefore, in the position shown in Fig. 5, pistons of cylinders Nos. 4, 3, 2 and 5 are all under compression. The piston of cylinder No. 3 is now compressing exhaust gases and after the exhaust comes the suction stroke, but when the intake valve of either cylinder opens, it finds the cylinder full of compressed spent gases, and so naturally no new gas from the carburetor can be taken into the cylinder, even with the control valve of the carburetor wide open. Therefore there will be no more power strokes as long as the two valves 25 are kept shut. Even with the carburetor valve wide open and the ignition on, all the pistons on their upstrokes, act to compress and so retard the speed of the car and finally stop it.

In the major portion of the above detailed description, I have only dealt with the exhaust closing valves and have used gas from the carburetor to build up a back pressure. As before stated, it is an old custom to use the motor for a brake to a certain extent. The best results are obtained under certain conditions by shutting off the ignition and letting the motor pump the gas, but this not alone wastes fuel but it may cause blowing off of the muffler, when the ignition is again switched on. The next best thing usually done is to keep the ignition on and to shut off the throttle on the carburetor. This will create a certain amount of vacuum in the cylinders, which will retard the speed of the car, but the successive vacuum strokes will draw some of the lubricating oil from the crank case into the cylinders. Therefore to save fuel, avoid damages and fouling of the cylinders, and for some braking purposes, I have placed the air inlets 17, each of a size slightly larger than half the size of the carburetor air inlet, between the carburetor and the cylinder inlets, so that all that is needed during braking periods, is the opening of the air valves 16. At this time the ignition is left on and there is no need of changing the position of the carburetor throttle, as the suction of the pistons will follow the line of least resistance and draw in air only through the inlets 17. To increase the speed of the car again, all that is needed is to shut off the valves 16, and the motor will be under power again without any jerking of the car.

I prefer to control the valves 16 and 25 by means capable of opening the valves 16 before the valves 25 are closed, so that I may use air entering 17 to dilute the fuel mixture for accelerating purposes when desired, without actuating the exhaust valves 25.

Reverting again to the suction strokes of the engine, it must be remembered that these strokes take power. Therefore, from Fig. 6 it may be seen that as the piston in cylinder No. 1 is ready for the power stroke, the piston in cylinder No. 6 has finished its exhaust stroke and is ready for the suction stroke. Assuming that the shut off valves 25 in the exhaust line have been closed and only a single auxiliary intake valve of the ordinary intake manifold is used, the combustion chamber of cylinder No. 6 is full of exhaust gas which is at compression pressure. Going a bit further, the suction valve No. 6 opens and the pressure from No. 6 goes into the intake manifold, and as the intake valve of No. 5 is open, it fills No. 5 cylinder and spoils the power absorption which so far No. 5 has created. This may be proved by leaving the air valves 16 of the new arrangement open when the exhaust line valves 25 are shut, for at this time the compressed exhaust gases will rush out past the air valves 16 and create a noise something similar to that when the cut out on the exhaust line is open. To overcome this I have placed the automatic check valves 18 and 20 on the auxiliary air inlets, these valves insuring that the exhaust gases will pass through 21 into the exhaust pipe 22, while the valves 18 will act to let fresh air into the pipes 15. When the valves 16 are closed, it is obvious that no air or gas will travel past the valves 18 and 20.

The valves 16 and 25 may be connected to a common control device accessible to the operator and adapted to be actuated by hand or foot. They may also be interconnected with the usual throttle handle on the steering post. I prefer to independently connect the valves 25 to the control means, so that one of the valves 16 and one of the valves 25 may be disconnected from the control means for a purpose hereinafter referred to.

In some motors, the intake manifold is cast in the cylinder head and the carburetor is bolted against the cylinder wall. To apply my improvement to such a motor, the inlet valves 16 are screwed into the manifold passages from above.

The number of valves depends on the number of cylinders and the firing order, the number and arrangement of valves being such that the pressure from one cylinder cannot rush into another cylinder whose valves may be open at the same time. This holds good for both the auxiliary intake and exhaust valves.

The novel structure which I have devised may be also used as a tire pump. For this purpose, we will assume that the car is stationary, the ordinary emergency brake on, the gears in neutral, and the motor running. I now disconnect the forward exhaust valve 25 and forward air intake valve 16 from the common control, so that I may operate each set of air inlet and exhaust valves independently of the other. The rear exhaust valve 25 is left open and the rear air inlet valve 16 is closed, so that the three rear cylinders function as an engine and run under ordinary carburetor and spark control. I now open the air inlet valve 16 for the first three cylinders, and these three forward cylinders cease to be power producing parts of the motor due to the excess of air, and their pistons are driven by the pistons in the three rear cylinders, and therefore the three forward cylinders become an air pump. I then shut the forward exhaust valves 25, so that the three forward cylinders become an air compressor and produce from 65 to 75 pounds of pressure, depending on the compression pressure of the motor, and this pressure may be utilized for pumping the tires. If the volume of air compressed is more than is needed, the forward exhaust valve 25 may be opened slightly. To permit the device to be used as a tire pump, a nipple 50 is placed on the forward pipe 23 and this nipple is normally closed by a screw cap 51. When the cap is removed, an air hose may be screwed on the nipple 50.

From the foregoing it is believed that the construction, operation and advantages of the invention may be readily understood and it is apparent that changes may be made in the details disclosed without departing from the spirit of the invention as expressed in the claims.

Having thus described my invention what I claim and desire to secure by Letters Patent is:

1. In a multi-cylinder engine of the type in which the exhaust valves of a plurality of cylinders are simultaneously open, an exhaust gas conduit, branch conduits placing said cylinders in communication with said exhaust gas conduit, and auxiliary valve means cooperating with said branch conduits for preventing gases compressed in one of said cylinders, while its exhaust valve is open, from passing into another one of said cylinders while the exhaust valve of the latter is simultaneously open.

2. In a multi-cylinder engine having an exhaust gas conduit and exhaust valves, conducting means placing the engine cylinders in communication with said conduit, and auxiliary valve means in said conducting means for preventing the exhaust gas from one cylinder passing into another of said cylinders when the engine is used for braking purposes.

3. In a multi-cylinder engine having an exhaust gas conduit and exhaust valves for controlling the passage of gas from the cylinders into the conduit, auxiliary valve means associated with said conduit for preventing the exhaust gas from one cylinder passing through the conduit into another of said cylinders.

4. In a multi-cylinder internal combustion engine, exhaust gas conducting means associated with the cylinders, exhaust valves for controlling the passage of gas from the cylinders into said conducting means, auxiliary conducting means placing the cylinders in communication with said exhaust gas conducting means, and auxiliary valve means cooperating with said auxiliary conducting means for preventing gases compressed in one of the said cylinders, while its exhaust valve is open, from passing into another one of said cylinders while the exhaust valve of the latter is simultaneously open.

5. In a multi-cylinder internal combustion engine, exhaust gas conducting means connected to the cylinders, exhaust valves for controlling the flow of gas from the cylinders into the conducting means, and auxiliary exhaust valve means for preventing exhaust gases from being discharged from the conducting means, said conducting means and valve means being so arranged relatively to the cylinders that the exhaust gas from one cylinder cannot pass to another cylinder even though the exhaust valves of both cylinders are open at the same time.

6. In a multi-cylinder internal combustion engine, induction gas conducting means associated with the cylinders, intake valves for controlling the flow of gas from the induction means into the cylinders of the engine, auxiliary valve means and air admission means associated with the induction means, all of said means being so arranged that gas forced into the induction means from one cylinder of the engine is prevented from passing into another cylinder of the engine while the intake valve of that cylinder is open, a common intake pipe for conducting an explosive mixture to said induction gas conducting means, and a single carburetor connected to the intake pipe for furnishing an explosive mixture to the intake pipe.

7. In a multi-cylinder internal combustion engine, induction gas conducting means for feeding an explosive mixture to the cylinders, auxiliary air admission means associated with the conducting means for feeding additional air into the cylinders when desired, ordinary intake valves for controlling the flow of gas from the conducting means into the engine cylinders, auxiliary valve means associated with the air admission means for controlling the latter, a common intake pipe connected to the induction gas conducting means for conveying an explosive mixture to be supplied to all of the cylinders, and a single carburetor connected to the intake pipe for furnishing an explosive mixture to the latter, said conducting means and the valve means being so arranged relatively to the cylinders as to prevent gas from one cylinder being forced through the conducting means into another of the cylinders when the intake valve of the latter is opened.

8. In an internal combustion engine of the type having auxiliary valve means in its exhaust gas conduit for braking purposes, the arrangement of said valve means and conduit in such manner as to permit each piston of the engine during an exhaust stroke to build up a back pressure in the exhaust conduit substantially equal to the compression pressure of the engine.

9. The combination with an internal combustion engine having induction gas conducting means and a special exhaust gas conducting means, ordinary intake valves for controlling the passage of gas from the induction gas conducting means into the cylinders of the engine, ordinary exhaust valves for controlling the passage of exhaust gas from the cylinders into the exhaust gas conducting means, means associated with the exhaust gas conducting means for permitting a back pressure to be created in the exhaust gas conducting means substantially equal to the compression pressure of the engine for braking purposes, and means associated with the induction gas conducting means for feeding substantially pure air into the cylinders when the engine is employed for braking purposes.

10. In a multi-cylinder engine having the usual intake and exhaust valves, an intake conduit including branches, each branch communicating with a group of cylinders of the engine, an exhaust conduit including branches, each of the last mentioned branches communicating with a group of the engine cylinders, and means associated with said conduits to permit certain cylinders of the engine to function as an engine while the other cylinders of the engine function as an air compressor.

11. In a multi-cylinder internal combustion engine, an intake conduit connected to a plurality of the cylinders of the engine, an independent intake conduit connected to another plurality of the cylinders of the engine, ordinary intake valves for controlling the flow of gas from said conduit into the cylinders, air admission means for each of said conduits to permit auxiliary air to be introduced into the cylinders when desired, and auxiliary valves associated with the air admission means adapted to be controlled by the operator.

12. In a multi-cylinder motor vehicle engine, an exhaust conduit for one group of cylinders of the engine, an independent exhaust conduit for another group of cylinders of the engine, ordinary exhaust valves for controlling the passage of exhaust gas from the cylinders into said conduit, and valve means associated with the conduits for preventing the exhaust gas from any cylinder of one group passing into any cylinder of the other group.

13. In a multi-cylinder engine for motor vehicles a common intake pipe adapted to be connected to the carburetor for feeding an explosive mixture to all of the cylinders of the engine, an intake conduit connected to said pipe for feeding the explosive mixture to a group of cylinders of the engine, an independent intake conduit connecting the intake pipe to another group of cylinders of the engine, auxiliary air admission means for each of said conduits, and means for controlling the passage of the auxiliary air into said conduits.

14. In a multi-cylinder engine for motor vehicles, a common intake pipe adapted to be connected to the carburetor for feeding an explosive mixture to all the cylinders of the engine, an intake conduit connecting said pipe to one group of the cylinders of the engine, another intake conduit connecting the pipe to another group of the cylinders of the engine, auxiliary air admission means associated with said conduits for admitting air into the conduits, valves actuated by the operator for controlling said air admission means, an exhaust pipe, and means for conveying gas from the conduits directly to said exhaust pipe.

15. An internal combustion engine including a cylinder provided with an intake conduit, an auxiliary air branch connected to said conduit and provided with check valve-controlled air admission and discharge openings, an exhaust pipe arranged to receive exhaust gas from the engine, means connecting the outlet of said branch with said exhaust pipe, and a valve in said branch between the valves of the latter and said conduit to permit the operator to control the passage of gas through said branch.

16. In a multi-cylinder internal combustion engine of the type having ordinary exhaust valves, an exhaust gas conduit associated with one group of cylinders of the engine, another exhaust gas conduit associated with another group of the cylinders of the engine, a common exhaust pipe connecting said conduits, and valve means for closing the conduits and preventing the exhaust gas from one group of said cylinders passing through said pipe to another group of said cylinders.

17. In a multi-cylinder engine of the type in which the exhaust valve in one cylinder opens while the exhaust valve of another cylinder remains open, a single exhaust pipe, a muffler connected to said pipe, conducting means associated with the exhaust pipe and having branches for discharging exhaust gas from the cylinders into said pipe, and auxiliary valve means cooperating with said branches to prevent gases compressed in one of said cylinders from passing into the other of said cylinders while the exhaust valves of both of said cylinders are simultaneously open.

18. In an internal combustion engine, a cylinder having ordinary intake and exhaust valves, an intake conduit for the cylinder provided with a carburetor, an exhaust conduit for the cylinder, auxiliary valve means in the exhaust conduit, and a passageway placing said conduits in communication to permit gas from one conduit to be passed to the other.

19. In a multi-cylinder engine, an exhaust gas passageway for each cylinder, an exhaust valve for each passageway, a plurality of said valves being adapted to open simultaneously during normal working of the engine, and means for preventing gases compressed in said cylinders, when the engine is used for braking purposes, from discharging through said passageways to atmosphere or from passing from one cylinder to another during simultaneous exhaust strokes of the two last mentioned cylinders.

In testimony whereof I affix my signature.

CHARLES REINEKE.